United States Patent [19]

Ruschek

[11] 4,287,782
[45] Sep. 8, 1981

[54] ELECTRIC REGULATING DEVICE

[75] Inventor: Gerhard Ruschek, Hattersheim, Fed. Rep. of Germany

[73] Assignee: VDO Adolf Schindling AG, Frankfurt am Main, Fed. Rep. of Germany

[21] Appl. No.: 955,458

[22] Filed: Oct. 27, 1978

Related U.S. Application Data

[62] Division of Ser. No. 860,678, Dec. 15, 1977, Pat. No. 4,187,734.

[30] Foreign Application Priority Data

Sep. 15, 1977 [DE] Fed. Rep. of Germany ....... 2741475

[51] Int. Cl.³ .................. B60K 31/00; F16H 57/00
[52] U.S. Cl. .............................. 74/405; 180/179
[58] Field of Search ............... 74/405, 625, 812; 180/170, 178, 179

[56] References Cited

U.S. PATENT DOCUMENTS

| 1,500,687 | 7/1924 | Taylor | 74/405 |
| 3,180,168 | 4/1965 | Harris | 74/405 |
| 4,132,284 | 1/1979 | Tomecek | 180/179 |

FOREIGN PATENT DOCUMENTS

| 635700 | 1/1962 | Canada | 74/405 |
| 1047565 | 12/1958 | Fed. Rep. of Germany | 74/812 |
| 1077939 | 3/1960 | Fed. Rep. of Germany | 74/405 |
| 44-5898 | 12/1969 | Japan | 74/405 |
| 341226 | 11/1959 | Switzerland | 74/405 |

Primary Examiner—Lawrence J. Staab
Attorney, Agent, or Firm—Martin A. Farber

[57] ABSTRACT

An electric regulating device, particularly for a speed control device for motor vehicles, with a servomotor and a rotatably mounted element which actuates the regulating member, the rotatable element particularly being a cable pulley which stands in operative connection with the servomotor via a gearing and a coupling device containing an electromagnet. At least one of the gears of the gearing is radially and at an angle indirectly or moveably mounted, and is connected indirectly or directly with an armature, which in turn cooperates with the electromagnet. The gearing includes a gearwheel operatively coordinated to the at least one gear. A spring biases the armature with a spring force for moving the one gear out of engagement with the gearwheel when the electromagnet is without current. The spring cooperates with means for reducing the pretension of the spring in the neutral position of the regulating device.

6 Claims, 5 Drawing Figures

ELECTRIC REGULATING DEVICE

This is a division of application Ser. No. 860,678, filed Dec. 15, 1977, now U.S. Pat. No. 4,187,734.

The invention relates to an electrical regulating device, particularly for a speed control device for motor vehicles, with a servomotor and a rotatably mounted element which actuates the regulating member, particularly said element being a cable pulley which stands in operative connection with the servomotor via a mechanical gearing and a coupling device containing an electromagnet.

Regulating or control devices of this type are already known which contain an electric d-c motor, the drive shaft of which stands in operative connection with a shaft via a mechanical gearing and an electromagnetic coupling. On the latter shaft there sits a cable pulley or roller for winding and unwinding, respectively, the line-shaped regulating member, for example, a chain. By the use of an electromagnetic coupling and its arrangement including two coaxial shafts there results an expensive construction of relatively large construction volume. It is true that the construction volume can be reduced by use of a worm gearing or worm drive. Apart from the fact that the size of the construction volume of such a device as before leaves more to be desired, further by the use of the worm gearing or worm drive, the production costs increase. Moreover such a worm gearing drive has a substantially lower efficiency and a considerably higher wear than a spur gear, so that already on this basis alone, in general the use of a worm gearing drive is renounced.

These disadvantages are eliminated and overcome by the present invention. It is thus one object of the invention to provide a regulating device which operates with the smallest possible wear, has a favorable efficiency and a small construction volume, and production costs are as small as possible.

This object is aided in its solution in accordance with another object of the present invention starting out from a regulating device of the introductory described type, in the manner that at least one of the gears (e.g., 14) of the mechanical gearing (13) is radially and inclined at an angle moveably mounted, and is connected with an armature (20), the latter cooperating with the electromagnet (21), a gearwheel being operatively coordinated to the at least one gear.

A spring (26) biasing the armature (20) or the arm (19) with a spring force such that with a currentless electromagnet (21), the gear (14) can positively come out of engagement from the gearwheel (12) which is coordinated thereto, and means (29, 30) are provided which reduce the pretension of the spring (26) in the neutral position of the regulating device. By such a measure it is achieved that upon the coupling engagement merely a slight pretension of the spring must be overcome. After actuation of the armature, that is, if the latter is disposed in its operating position in contact abutment on the electromagnet and the maximum pulling force exists, the pretension of the spring increases to the necessary value for a positive uncoupling. The electromagnetic circuit can thus be laid out or designed for a comparatively small pulling force and consequently its construction volume is substantially reduced. Also in this manner the efficiency of the regulating device may be further improved.

According to a preferred form of realization of the invention, a compression or pressure spring (26) is provided, which with one end thereof stands in connection with the armature (20) and with its other end (27) is supported on a cam wheel (29), the latter being directly or indirectly coupled with that element (9) which actuates the regulating member (10). The cam wheel has an irregular peripheral course so that the spacing between the armature and the periphery of the cam wheel changes in the range of the spring and consequently the pretension of the spring, which is supported on the armature and on the periphery of the cam wheel, changes in dependency on the prevailing respective position of the cam wheel.

For achieving a compact construction of the regulating device it is recommended to provide a torsion spring (26) and a circularly-shaped cam wheel (29) which has on one peripheral position thereof a V-shaped cut or notch (30) for the spring end (27). On the same basis it has also proven advantageous to arrange the cam wheel (29) and the element (9) which actuates the regulating member (10) concentric with respect to one another and to form an integral unit thereof.

With the above and other objects and advantages in view, the present invention will become more clearly understood in connection with the following detailed description of two preferred embodiments, when considered with the accompanying drawings, of which:

Figure 1:
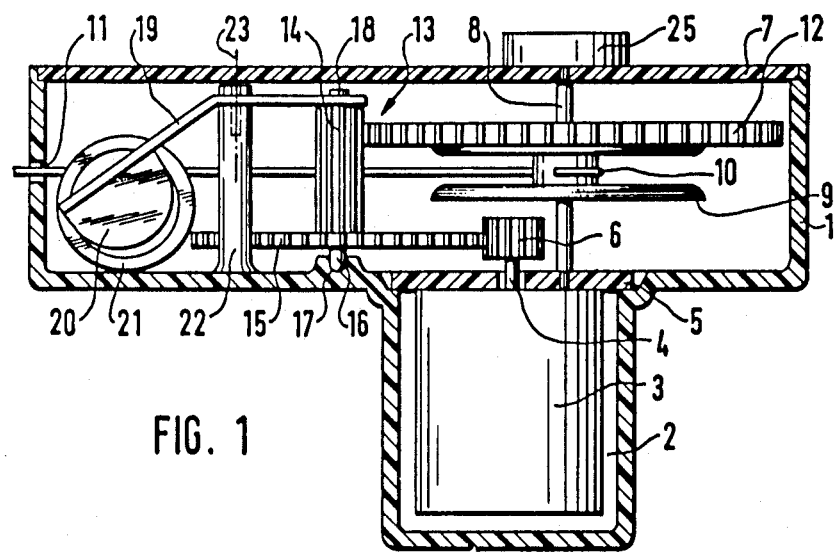
FIG. 1 is a side view, partially in section of a regulating device.
Figure 2:
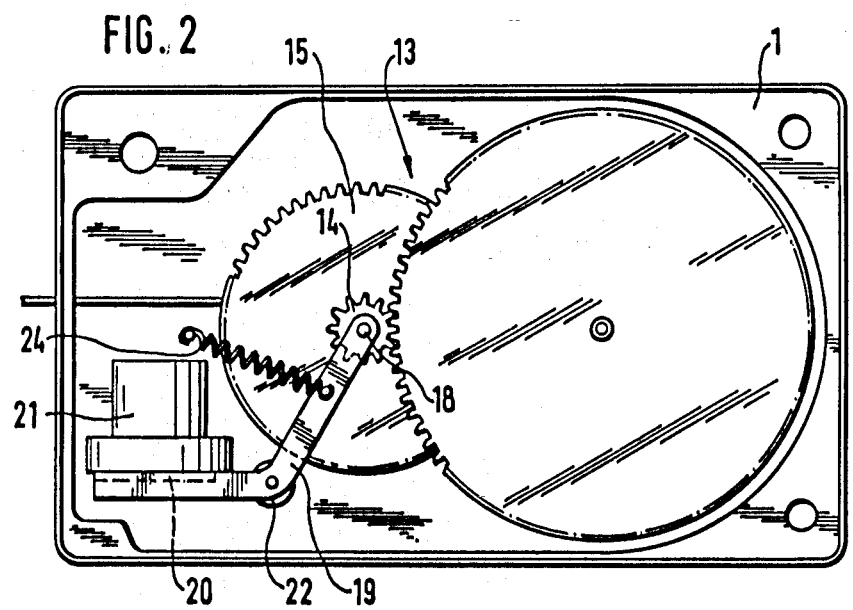
FIG. 2 is a plan view of the regulating device according to FIG. 1 with the cover removed.

Referring now to FIGS. 1 and 2 of the drawings, a d.c. motor 3 is located in a cylindrical space 2 in a synthetic material or plastic housing 1 of the regulating device (illustrated in FIGS. 1 and 2), the latter being provided for a speed control device. The shaft 4 of the motor 2 projects through an opening in a closure cover 5 and carries a pinion 6 on its free end.

A shaft 8 is mounted in the closure cover 5 and in the cover 7 of the housing 1, on which shaft 8 there is seated a cable pulley or roller 9 for winding and unwinding the cable-formed regulating member 10. On one side the cable 10 is secured to the cable pulley 9 and the other side it is guided outwardly through an opening 11 in the housing 1 and is articulated to the carburettor or throttle control rod (not illustrated) of the motor vehicle.

A toothed gearwheel 12 is formed on or attached to the cable pulley 9, which gearwheel 12 is a part of the mechanical gearing 13. The mechanical gearing 13 furthermore includes gearwheels 14 and 15, which together with a shaft 16 thereof form an integral unit made of synthetic material or plastic. One end of the shaft 16 is semispherical rounded-off and is mounted in a calotte or spherical indentation 17 which is formed on the housing 1, whereas the other end of the shaft 16 is provided with a pin 18, which pin operatively engages in a corresponding opening in an arm 19 in such manner, that a relative displacement and tilting of the pin 18 in the opening is possible. The arm 19 is disposed on an armature 20 of an electromagnet 21 and is pivotally mounted on a carrier 22 about the axis 23. With the electromagnet 21 applied with current, the pinion 6 stands in operative connection with the cable pulley 9 via the gearwheels 14, 15 and 12, whereas with a currentless electromagnet 21 a tension spring 24 which acts on the arm 19 brings the gear 14 out of engagement from the gear 12 and thus the power flow from the motor 2 to the cable pulley roller 9 is interrupted.

The regulating device furthermore contains a position indicator or encoder 25 which is rigidly coupled with the shaft 8 and the cable pulley 9, respectively, and is formed as a variable rheostat or preset potentiometer. It reports or signals the prevailing respective position of the cable pulley 9 to the control device. The wiring circuitry of the regulating device can occur in known manner in the frame of a speed control device. For this by way of example reference is made to German Auslegeschrift No. 12 14 103 which shows such a circuit wiring.

Figure 3:
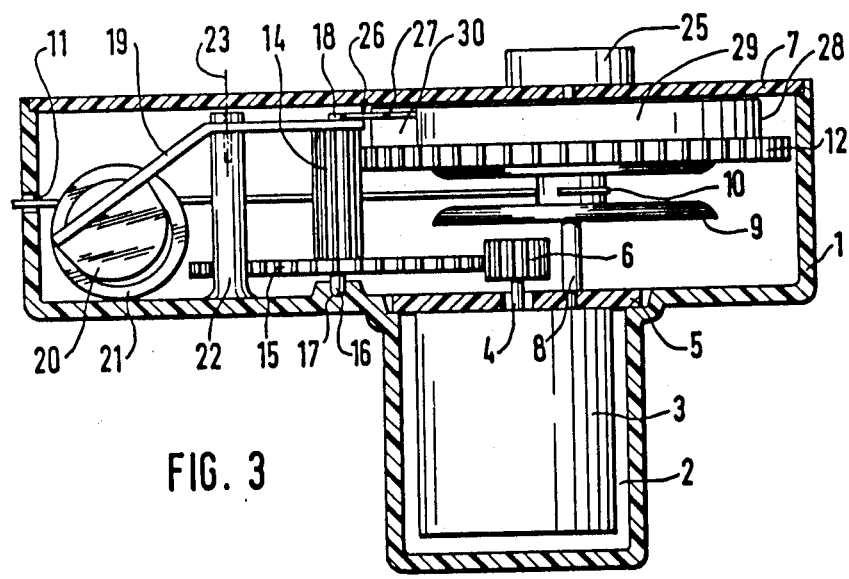
FIG. 3 is a side view, partially in section of another regulating device in accordance with the invention.
Figure 4:
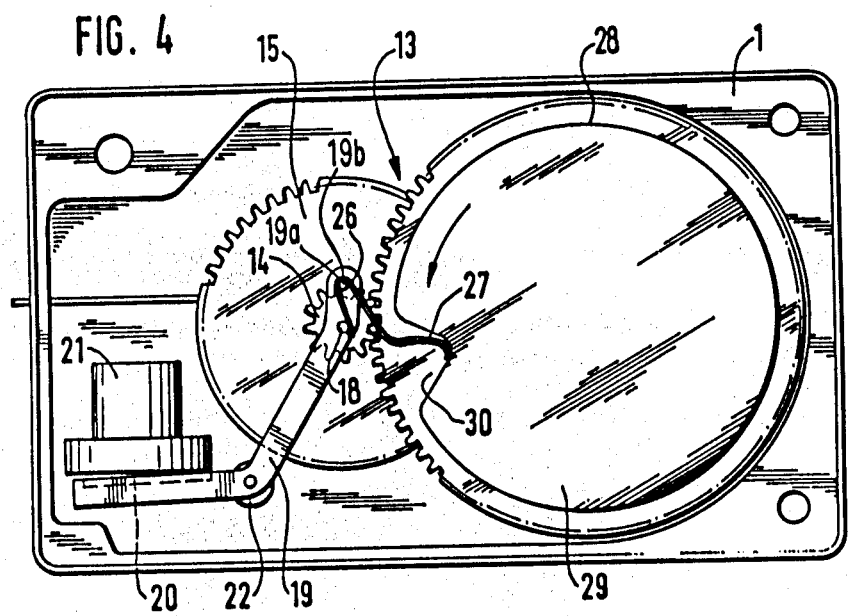
FIG. 4 is a plan view of the regulating device of FIG. 3 with the cover removed.

The regulating device in accordance with the present invention according to FIGS. 3 and 4 essentially has the same construction as the previously described device—merely compared to the tension spring 24 and its cooperative relationship in the device, having differences of consequence.

The torsion spring 26 (which is provided instead of the tension spring 24 of FIGS. 1 and 2) is supported with its free end 27 on the periphery 28 of a circular-shaped cam wheel 29, the latter having a V-shaped cut or recess 30 on one point of its periphery. The other end of the spring 26 engages the pin 18 on the side thereof facing the cam wheel 29 and the central-shaped portion of the spring 26 engages around a pin 19a which is secured to the free end 19b of the arm 19, the free end 19b being bent back angularly relative the rest of the arm 19. The cam wheel 29 forms an integral unit with the gearwheel 12 and is arranged concentric to the latter. The position of the cut 30 is selected such that in the neutral regulating position of the cable pulley 9, the spring 26 is supported with its free end 27 on the bottom or base of the cut 30. In this position of the cam wheel 29 and spring 26, the pretension of the spring is small.

As soon as the electromagnet 21 is excited and the armature 20 is attracted or pulled, the gear 14 goes into engagement with the gear 12, which together with the cam wheel 29 begin to turn. In this manner the free end 27 of the spring 29 rises out of the cut 30 on the periphery 28, whereby the pretension of the spring 26 is increased to the necessary degree for a quick and nonobjectional decoupling.

In addition to the already mentioned advantages, the last described regulating device FIGS. 3 and 4 also has the advantage that the two gearwheels 12 and 14 which are coupleable with one another are subject to insignificant wear compared to that of the other regulating device FIGS. 1 and 2. With an overload of the mechanical gearing, for example in the manner where the cable 10 is completely would on the cable pulley 9 and thus in spite of the continuing running motor, the gearwheel 12 cannot be moved further, namely the gear 14 is expelled from the gear toothing of the gear 12, whereby the armature is released and breaks-away due to the great pretension of the spring 26 in spite of an excited electromagnet. The result is that not as with the regulating device in accordance with FIGS. 1 and 2 that the teeth of the gearwheel 14 clatter or ratchet over that of the stationary gearwheel 12, but rather the teeth of the gearwheel 14 can rotate without contact with the gearwheel 12. In this manner it is guaranteed that the teeth of both gearwheels are not damaged. A further advantage of the regulating device according to the present invention of FIGS. 3 and 4 resides in that a coupling engagement can occur or be initiated only in the neutral regulating position of the cable pulley 9. If consequently on the basis of a defect in the regulating device or at the carburettor or throttle control rod, a reverse movement of the cable pulley 9 into its idle regulating position is not possible, then the regulating device cannot be placed in operation. In this respect, the regulating device is subject to control in a non-objectionable operation. A further advantage of this regulating device finally resides in that by the cut 30 and the free end 27 of the spring 26, which free end projects into the cut 30, the zero or neutral position of the cable pulley 9 and consequently also that of the position indicator or encoder 25 are precisely defined. In this manner it is guaranteed that the motor 3 is switched off in the neutral regulating position of the cable pulley 9 via the position indicator 25 and the actual control device and does not run-on unit a further operation or restarting of the regulating device.

Figure 5:
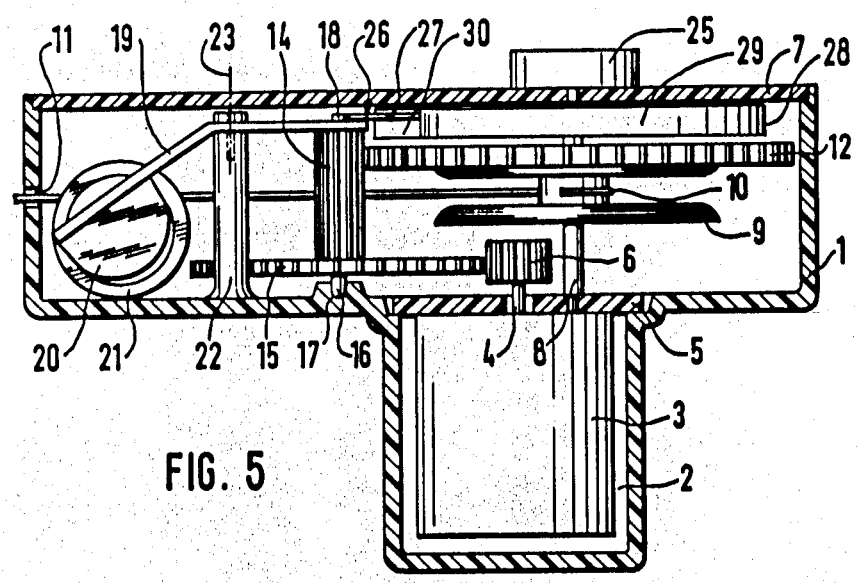
FIG. 5 is a side view, partially in section of another embodiment of a regulating device in accordance with the invention.

Finally FIG. 5 shows a side view, partically in section of another regulating device in accordance with the invention. The device differs from this one shown in FIG. 3 in that the cam wheel 29 is coupled indirectly with the element 9.

While there has been disclosed two embodiments of the invention it is to be understood that these embodiments are given by example only and not in a limiting sense.

I claim:

1. An electric regulating device, particularly for a speed control device for motor vehicles, comprising
   a regulating member,
   means for actuating said regulating member, said means constituting a rotatably mounted element,
   a servomotor,
   a coupleable mechanical gearing means and a coupling means therefor including an electromagnet for operatively connecting said element with said servomotor,
   an armature cooperating with said electromagnet, and
   said gearing means includes a plurality of gears, at least one of said gears of said gearing means being substantially radially moveably mounted and being operatively connected with said armature,
   said gearing means including a gearwheel operatively coordinated to said at least one gear,
   spring means for biasing said armature by a spring force for moving said one gear out of engagement with said gearwheel when said electromagnet is without current,
   means for reducing pretension of said spring means in a neutral position of the regulating device,
   said pretension reducing means includes a cam wheel operatively coupled to said element,
   said spring means comprises a compression spring having one end in connection with said armature and having another end supported on said cam wheel,
   a housing,
   said at least one gear constitutes another gearwheel having a shaft,
   said shaft is articulated on one end thereof on said housing, an arm disposed on said armature, and
the other end of said shaft is disposed on said arm,
said one end of said shaft is formed semi-spherically,
said housing is formed with a spherical indentation,
said one end of said shaft is mounted in said spherical indentation,
said other end of said shaft is formed into a pin-shaped set-off,
said arm is formed with an opening,
said pin-shaped set-off is inserted through said opening in said arm,
said one end of said compression spring is mounted on said arm against said pin-shaped set-off,
said arm includes a free end adjacent said opening,
a pin is secured to said free end of said arm, and
said spring means includes a substantially U-shaped central portion engaged around said pin.

2. The regulating device as set forth in claim 1, wherein
said spring means is a torsion spring,
said cam wheel is circularly-shaped and has a periphery formed at one peripheral position thereof with a substantially V-shaped cut,
said another end of said spring is adapted to engage in said cut.

3. The regulating device as set forth in claim 1, wherein
said cam wheel is directly coupled with said element.

4. The regulating device as set forth in claim 1, wherein
said cam wheel is indirectly coupled with said element.

5. The regulating device as set forth in claim 1, wherein
said cam wheel and element are arranged concentrically with respect to one another and form an integral unit.

6. The regulating device as set forth in claim 1, wherein
said element is formed as a cable pulley.

* * * * *